(12) United States Patent
Mercier et al.

(10) Patent No.: US 11,070,645 B1
(45) Date of Patent: Jul. 20, 2021

(54) FLEXIBLE SCHEDULING OF DATA TRANSFERS BETWEEN COMPUTING INFRASTRUCTURE COLLECTIONS FOR EFFICIENT RESOURCE UTILIZATION

(71) Applicant: Amazon Technologies, Inc., Seattle, WA (US)

(72) Inventors: Benjamin Warren Mercier, Seattle, WA (US); Thomas Bradley Scholl, Seattle, WA (US); Douglas Brian Terry, San Carlos, CA (US); Craig Wesley Howard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 89 days.

(21) Appl. No.: 16/221,032

(22) Filed: Dec. 14, 2018

(51) Int. Cl.
| | | |
|---|---|---|
| *H04L 29/08* | (2006.01) | |
| *H04L 29/06* | (2006.01) | |
| *H04L 12/727* | (2013.01) | |
| *H04L 12/725* | (2013.01) | |
| *H04L 12/729* | (2013.01) | |

(52) U.S. Cl.
CPC .......... *H04L 67/325* (2013.01); *H04L 45/121* (2013.01); *H04L 45/125* (2013.01); *H04L 45/306* (2013.01); *H04L 67/327* (2013.01); *H04L 69/14* (2013.01)

(58) Field of Classification Search
CPC ... H04L 67/325; H04L 45/306; H04L 45/121; H04L 67/327; H04L 45/125; H04L 69/14
See application file for complete search history.

(56) References Cited

U.S. PATENT DOCUMENTS

| | | | | |
|---|---|---|---|---|
| 8,098,584 | B2* | 1/2012 | Zhang | H04L 45/70 370/238 |
| 8,131,693 | B2* | 3/2012 | Hiltunen | G06F 16/00 707/703 |
| 2010/0332401 | A1* | 12/2010 | Prahlad | H04L 67/1097 705/80 |
| 2012/0179824 | A1* | 7/2012 | Jackson | G06F 9/5072 709/226 |
| 2013/0174172 | A1* | 7/2013 | Naga | G06F 9/4881 718/103 |
| 2013/0204963 | A1* | 8/2013 | Boss | G06F 3/061 709/217 |

(Continued)

*Primary Examiner* — Joe Chacko
(74) *Attorney, Agent, or Firm* — Robert C. Kowert; Kowert, Hood, Munyon, Rankin & Goetzel, P.C.

(57) ABSTRACT

A data delivery service of a service provider may receive respective job specifications for different data transfer jobs between computing infrastructure collections (e.g., data centers). A job specification for a data transfer job may include an amount of data to be transferred for the data transfer job, one or more destinations of data transfers for the data transfer job, and/or one or more flexibility parameters for successful transfer of the data for the data transfer job (e.g., a deadline to transfer the data, available data delivery techniques). The data delivery service may determine a schedule for performing different data transfer jobs between two or more infrastructures based on an analysis of the amount of data to be transferred for each job, the destinations of the data transfer for each job, the flexibility parameters for each job (e.g., included in the respective job specifications), and the connectivity between computing infrastructure collections.

20 Claims, 7 Drawing Sheets

(56) References Cited

U.S. PATENT DOCUMENTS

| | | | |
|---|---|---|---|
| 2015/0173103 A1* | 6/2015 | Lunden | H04W 74/04 370/331 |
| 2015/0264135 A1* | 9/2015 | Kandula | H04L 47/127 709/204 |
| 2016/0037240 A1* | 2/2016 | Yang | H04Q 11/0003 398/45 |
| 2017/0149624 A1* | 5/2017 | Chitti | H04L 43/0876 |
| 2018/0145878 A1* | 5/2018 | Savov | H04L 47/781 |
| 2018/0183864 A1* | 6/2018 | Bender | H04L 47/765 |

* cited by examiner

FLEXIBLE SCHEDULING OF DATA TRANSFERS BETWEEN COMPUTING INFRASTRUCTURE COLLECTIONS FOR EFFICIENT RESOURCE UTILIZATION

BACKGROUND

Service providers may offer various online services to clients around the globe. Therefore, a provider networks of a service provider may include many different data centers located in different regions around the world so that services can be provided efficiently at a more local level. Moreover, data durability may be achieved by storing replications of data at different data centers. A client may desire to analyze data in one region, even though the data may be collected from another region. Thus, for various reasons, a services that are located in different regions may need to transfer data between themselves on a frequent basis.

Due to the varying demand for data transfers between regions, a service provider's backbone network may become congested and less reliable during peak traffic times and become relatively underutilized during off-peak times. Data transfers that are attempted using the backbone network during high-traffic periods are susceptible to delay, errors, and even failure of transmission. The problems associated with network congestion may be compounded when multiple different types of services are attempting to perform numerous cross-region data transfers using the same backbone network of a service provider.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for implementing flexible scheduling of data transfers between computing infrastructure collections (e.g., between data centers in different regions) for efficient utilization of data transfer resources (e.g., backbone network resources, delivery vehicles, etc.). In embodiments, a computing infrastructure collection may be a physical location-based grouping and/or logical grouping of computing devices, where the computing devices are physically and/or logically separate from one or more other groups of computing devices that may each also be grouped according to physical location-based grouping and/or logical grouping.

In some embodiments, the computing devices of a computing infrastructure collection may belong to a local network and the computing devices of another computing infrastructure collection may belong to a remote network. For example, a data center located in a city or region of the U.S. (e.g., servers and/or other computing devices that belong to the same local network of the U.S. data center) may be considered a computing infrastructure collection and another data center located in a city or region of Canada (e.g., servers and other computing devices that belong to the same local network of the Canada data center) may be considered another computing infrastructure collection.

In embodiments, any country, continent or other area may be divided into any number of geographical areas (e.g., regions, cities, metropolitan areas, etc.), and each of those geographical areas may include any number of computing infrastructure collections. In some embodiments each computing infrastructure collection may be referred to as an "availability zone" that are connected with each other (e.g., through low-latency network links that use one or more data delivery techniques). If a computing instance (e.g., a server or other computing resource) running an application fails in one availability zone, then another computing instance in another availability zone may begin handling new requests for the application. As used herein, the term "infrastructure" refers to a computing infrastructure collection.

In some embodiments, a data delivery service of a service provider may receive respective job specifications for different data transfer jobs between infrastructures. A job specification for a data transfer job may include an amount of data to be transferred for the data transfer job, one or more destinations of data transfers for the data transfer job, and/or one or more flexibility parameters for successful transfer of the data for the data transfer job (e.g., a deadline to transfer the data, available data delivery techniques, etc.).

In embodiments, the data delivery service may determine connectivity (e.g., data transfer capability for one or more respective data delivery techniques) between any number of different infrastructures (e.g., between different pairs of the infrasturctures). Thus, in some embodiments, the connectivity between one infrastructure and another infrastructure may be the available bandwidth (e.g., data transmission capacity) to transfer data from one infrastructure to the other for one or more different data delivery techniques. For example, the data delivery service may determine that the connectivity between two infrastructures includes data delivery capability using a satellite at a particular transmission bandwidth, data delivery capability using fiber at another transmission bandwidth, and data delivery capability using delivery of physical storage devices at a transit time to the destination.

The data delivery service may schedule a data transfer job using one of the above techniques (satellite, fiber, physical delivery) based on analysis as described herein. In some embodiments, the transmission bandwidth may be zero (e.g., if a satellite link is down). Furthermore, if the status of the source service, destination service, source data delivery service, destination data delivery service, or any other hardware or software transmission component at the source infrastructure or destination infrastructure used for at least one of the transfer jobs fails or is stops transmitting data, then the connectivity for at least the transfer job and/or the connectivity for any data delivery techniques affected by the failure or stoppage may be determined to be zero (e.g., not capable of transferring data).

In various embodiments, the connectivity between infrastructures may be one or more conditions for transferring data between the infrastructures using one or more available data delivery techniques for transferring data between the infrastructures. As described above, one of the conditions for a particular data delivery technique may be available transmission bandwidth. Other conditions may be cost to transmit the data using the data delivery technique, data transmission failure rate using the data delivery technique, an amount of congestion for transmission paths using the data delivery technique (e.g., for a network or backbone network), or an expected amount of congestion for transmission paths using the data delivery technique (e.g., for a network or backbone network) due to scheduled data transfer paths that have not yet started. Thus, the data delivery service may select a data transfer route and/or transfer technique from among multiple available data transfer routes and/or transfer techniques based on cost to use the route (e.g., due to lease or other usage cost) and on the transmission bandwidth of the route in order to optimize the cost. For example, a maximum cost to transfer the data may be determined and then the fastest route that allows the data to be delivered at or below the maximum cost may be selected.

The data delivery service may determine a schedule for performing different data transfer jobs between two or more of the infrastructures based on an analysis of the amount of data to be transferred for each job, the destinations of the data transfer for each job, the flexibility parameters for each job (e.g., included in the respective job specifications), and the connectivity between the infrastructures.

In various embodiments, the analysis utilizes the flexibility parameters of the data transfer jobs in scheduling the data transfer jobs to distribute the data transfer jobs over time in view of the connectivity to improve efficient utilization of data transfer resources. In some embodiments, the amount of traffic and associated congestion in a backbone network that would normally occur during peak traffic times may be reduced using the techniques described herein, resulting in fewer delays, faster data delivery times, lower cost to deliver data, and a lower number of data delivery failures (e.g., lower data delivery failure rate).

In embodiments, any suitable security communication protocols may be used to protect data that is being sent between any devices and/or networks (e.g., provider network, client network, backbone network, cellular networks, etc.). For example, data may be encrypted using SSL (secure socket layer), TLS (transport layer security), HTTPS (secure hypertext transfer protocol), and/or any other suitable network security protocol.

Figure 1:
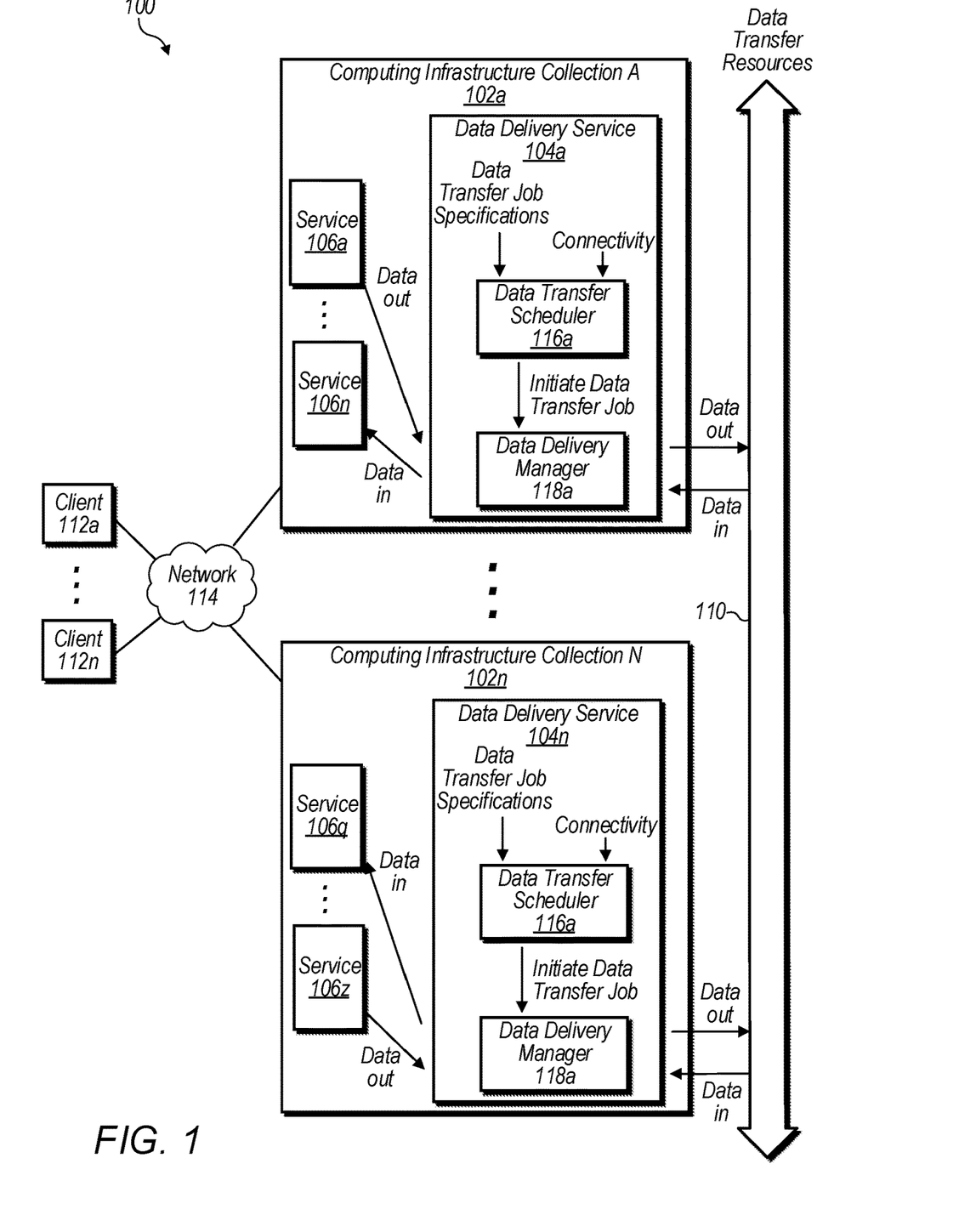
FIG. 1 illustrates a system for flexible scheduling of data transfers between computing infrastructure collections for efficient resource utilization, according to some embodiments.

FIG. 1 illustrates a system for flexible scheduling of data transfers between computing infrastructure collections for efficient resource utilization, according to some embodiments. In embodiments, the infrastructures 102 and any other components depicted in FIG. 1 may be the same as or include one or more of the same components as the infrastructures and any other components depicted in any of FIGS. 2-4.

In the illustrative embodiment, a service provider's network may include multiple different infrastructures 102. Each infrastructure 102 of the provider network may include a data delivery service 104 and any number of other services 106 (e.g., data storage services, compute services, etc.).

As shown, data may be transferred from one infrastructure to another infrastructure via data transfer resources 110. In embodiments, some or all of the data transfer resources are managed and/or owned by the service provider and some or all of the data transfer resources may be available for public use, leased, or shared with other entities (e.g., a backbone network of the service provider, portions of the internet).

In embodiments, any number of external clients 112 may use any of the services of the service provider by communicating via a wide area network 114 (e.g., the internet). For example, an external client may provide data transfer job specifications to the data delivery service for any number of data transfer jobs. As illustrated, the data delivery service may include a data transfer scheduler 116 that schedules data transfer jobs between infrastructures and a data delivery manager 118 that coordinates data transfers for the data transfer jobs.

As illustrated, the data transfer scheduler may receive a data transfer specification for each data transfer job. The data transfer scheduler may also receive the connectivity between infrastructures (e.g., one or more conditions for transferring data between infrastructures).

In embodiments, the data transfer scheduler may receive respective job specifications for different data transfer jobs between infrastructures. Each job specification may include an amount of data to be transferred for the data transfer job, one or more destinations of data transfers for the data transfer job, and one or more flexibility parameters for successful transfer of the data for the data transfer job. For example, one job specification may specify an amount of data to be transferred from a source (e.g., a service) within a local infrastructure to two different destinations (e.g., other services of the same or different type) within two other infrastructures. The data transfer scheduler may also determine connectivity between infrastructures.

In some embodiments, the data transfer scheduler may determine a schedule for performing different data transfer jobs between two or more infrastructures based on an analysis of the amount of data to be transferred for each job, the destinations of the data transfer for each job, the flexibility parameters for each job (e.g., included in the respective job specifications), and the network conditions. For example, data transfer from the service 106a to the service 106q may be initiated at a particular time and/or in a particular order with respect to other jobs according to the schedule.

In embodiments, the service 106q will send an acknowledgement of successful data transfer back to the service 106a using the same data transfer technique that was used for sending the data from the service 106a to the service 106q. For example, if the data was sent using satellite, then the acknowledgement will be returned using satellite. In some embodiments, the acknowledgement (e.g., the data of the acknowledgement) is scheduled as a data transfer job, where the service 106a is the destination. In such cases, the data transfer job is scheduled as described above using the same flexibility parameters that were used to send the original data.

In embodiments, the analysis utilizes the flexibility parameters of the data transfer jobs in scheduling the data transfer jobs to distribute the data transfer jobs over time in view of the connectivity to improve efficient utilization of data transfer resources. Thus, the amount of traffic and associated congestion that would normally occur on the data transfer resources (e.g., on a backbone network or other resources) during peak traffic times may be reduced, resulting in fewer delays, faster data delivery times, lower cost to deliver data, and a lower number of data delivery failures (e.g., lower data delivery failure rate).

In the illustrated embodiment, one or more flexibility parameters for one or more of the data transfer jobs may include a deadline to transfer the data to the one or more destinations of the one or more respective data transfer jobs. In such embodiments, the data transfer scheduler may determine the schedule for performing the data transfer jobs between infrastructures based at least on analysis of the deadline to transfer the data to the one or more destinations of the one or more respective data transfer jobs. The data transfer scheduler may then initiate the transfer of the data for the plurality of data transfer jobs in accordance with the deadline to transfer the data for the one or more respective data transfer jobs. For example, some jobs for a smaller amount of data and earlier deadlines may be scheduled to occur before (or using a faster data delivery technique) other jobs for a larger amount of data and later deadlines. This may allow the data transfer jobs to be successfully delivered by the deadlines.

In some embodiments, one or more flexibility parameters for one or more of the data transfer jobs includes different acceptable data delivery techniques to transfer the data to the one or more destinations of the one or more respective data transfer jobs. In such embodiments, the data transfer scheduler may determine the schedule for performing the data transfer jobs between infrastructures based at least on analysis of the different acceptable data delivery techniques to transfer the data to the one or more destinations of the one or more respective data transfer jobs. For example, some jobs with earlier deadlines may be scheduled to use a faster and/or costlier data delivery technique and other jobs with later deadlines may be scheduled to use a slower and/or less costly data delivery technique. The data transfer scheduler may then initiate the transfer of the data for the plurality of data transfer jobs in accordance with the acceptable data delivery techniques to transfer the data for the one or more respective data transfer jobs.

In embodiments, a flexibility parameter may specify two or more different destinations at different infrastructures that are acceptable for transferring data to for a particular job. Thus, the data delivery service may select one of those destinations based on connectivity (e.g., least cost, fastest delivery, etc.). In some cases, the flexibility parameter may specify that the destinations are limited to infrastructures within a particular country or countries. The flexibility parameter may specify that the data must be replicated to two or more infrastructures within a particular country. The flexibility parameter may specify that delivery of the data cannot traverse a particular country.

In some embodiments, the flexibility parameter may specify that one or more copies of the data must be replicated to another one or more infrastructures within a threshold period of time after (e.g., after start of the transfer job or after the data is transferred to a destination infrastructure). In embodiments, one or more flexibility parameters may be added or "stacked" onto a data transfer job before or during transfer of the data. For example, another entity or country that transfers data for the job may specify flexibility parameters that apply rules to the data so that only data that complies with the rules may be transmitted (e.g., rules for data transmission, data content, data security, etc.). Thus, the data being transferred for a job may go through arbitrage based on policies of different countries or other entities that apply one or more flexibility parameters to transfer the data.

Any suitable data delivery technique (and associated data transfer resources for providing a data delivery technique) for sending data may be acceptable for use, in various embodiments. For example, in various embodiments, the acceptable delivery techniques may include one or more of fiber, dedicated fiber, satellite, cellular, digital subscriber line, microwave, radio, a pre-established connection to the one or more destinations (e.g., selected from a pool of available backplane connections), a secure channel (e.g., a VPN (virtual private network) tunnel), or physical transport (e.g., land or air vehicle) via data storage device.

In some embodiments, the destination service may be a different type of service than the local originating service. For example, the local service may store data according to an object-based scheme and remote service may store data according to a relational database scheme (e.g., different storage techniques). In some embodiments, a storage service may send data to a compute service in another infrastructure and vice-versa (e.g., for data analysis or storage).

As described above, the connectivity may include network conditions (e.g., a backbone network). Network conditions may include one or more of an amount of congestion for one or more transmission paths of the network or an expected amount of congestion for one or more of the transmission paths of the network due to scheduled data transfer jobs that have not yet started. This may allow the data delivery service to efficiently allocate and schedule jobs based on current and expected future network bandwidth demand/usage.

In some embodiments, data transfer jobs may be performed by streaming data from a service of an infrastructure to another service of another infrastructure. Thus, in embodiments, to initiate the transfer of the data for the data transfer jobs between infrastructures in accordance with the schedule, the data delivery service may initiate a data stream for at least one of the scheduled data transfer jobs to begin streaming the data from a local service to a destination (e.g., another service in the other infrastructure) of the scheduled data transfer job using a data delivery route and/or data delivery technique.

In embodiments, the data delivery service dynamically changes the delivery route (or data delivery technique) for streaming data or otherwise transferring data to the destination based on changing conditions of data delivery resources. For example, the data delivery service may determine updated connectivity (e.g., updated network conditions of the backbone network or updated condition of a satellite) and determine an updated schedule for performing the data transfer jobs between infrastructures based at least on another analysis of a remaining amount of the data to be transferred, destinations of the data transfers, the flexibility parameters for the respective job specifications, and the updated connectivity. The other analysis utilizes the flexibility parameters in scheduling the data transfer jobs to distribute the data transfer jobs over time in view of the updated connectivity to improve efficient utilization of data transfer resources (e.g., network resources of the backbone network, satellites, cellular towers, etc.).

The data delivery service may then cause a remaining amount of the data for at least one scheduled data transfer job to begin streaming to the destination of the scheduled data transfer job using a different data delivery route (and/or delivery technique) in accordance with the updated schedule. Thus, a stream may be re-routed depending on changing connectivity. Changing a deliver route or deliver technique may be useful when a data transfer resource (e.g., a router or other device) fails and it is difficult or takes a long period of time to discover which device failed in order to replace or repair it.

In some embodiments, the delivery service may pause the streaming of a remaining amount of the data from the local service to the destination in accordance with the updated schedule. In response to passage of a threshold period of time since the pausing of the streaming, the delivery service may resume the streaming of the remaining amount of the data from the local service to the destination of the scheduled data transfer job.

In embodiments, the delivery service may determine updated connectivity and determine an updated schedule for performing the plurality of data transfer jobs based at least on another analysis of a remaining amount of the data to be transferred, destinations of the data transfers, the flexibility parameters for the respective job specifications, and the updated connectivity (e.g., wherein the other analysis utilizes the flexibility parameters in scheduling the data transfer jobs to distribute the data transfer jobs over time in view of the connectivity to improve efficient utilization of data transfer resources). The delivery service may then initiate the transfer of the data for a remainder of the plurality of data transfer jobs in accordance with the updated schedule.

In various embodiments, the delivery service may change an order of the scheduled jobs based on changed connectivity or based on one or more newly added data transfer jobs. For example, the delivery service may receive one or more additional respective job specifications for additional data transfer jobs, where each specification includes an amount of data to be transferred for the additional data transfer job, one or more destinations of data transfers for the additional data transfer job, and one or more flexibility parameters for successful transfer of the data for the additional data transfer job.

The delivery service may then determine an updated schedule for performing the data transfer jobs and the additional data transfer jobs based at least on another analysis of the amount of data to be transferred for the additional data transfer jobs and a remaining amount of data to be transferred for the data transfer jobs, the destinations of the data transfers for the additional data transfer jobs and the data transfer jobs, the flexibility parameters for the respective job specifications for the additional data transfer jobs and the data transfer jobs, and the updated connectivity. The order of the data transfer jobs of the updated schedule may be changed. The delivery service may then initiate the transfer of the data for a remainder of the plurality of data transfer jobs and the additional data transfer jobs in accordance with the updated schedule.

Figure 2:
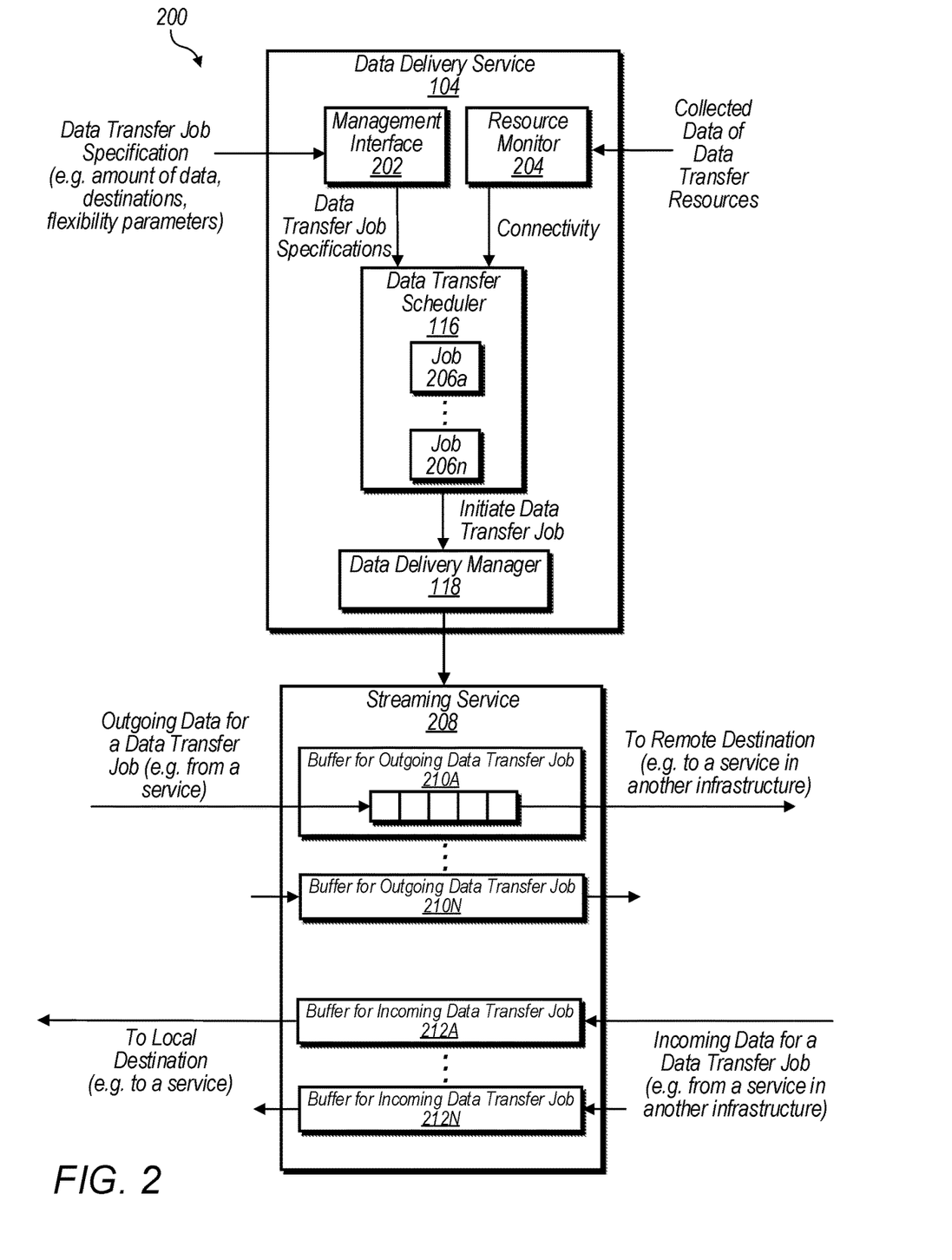
FIG. 2 is a block diagram of a data delivery service and streaming service that implements flexible scheduling of data transfers between computing infrastructure collections for efficient resource utilization, according to some embodiments.

FIG. 2 is a block diagram of an a data delivery service and streaming service that implement flexible scheduling of data transfers between computing infrastructure collections for efficient resource utilization, according to some embodiments. In the depicted embodiment, the data delivery service includes a management interface 202 for receiving job specifications from services and/or external clients (e.g., via application programming interfaces). As shown, the data delivery service also includes a resource monitor 204 to collect data associated with data transfer resources (e.g., data from a backbone network, satellite, etc.), analyze the data to determine connectivity between infrastructures, and provide the connectivity to the data transfer scheduler.

In embodiments, the data transfer scheduler determines the schedule of data transfer jobs 206 based on the job specifications and connectivity, as described herein. The data delivery manager may then initiate data transfer jobs in accordance with the schedule.

In the depicted embodiment, the data delivery manager initiates a new outgoing data stream for each job by sending a message or command to a streaming service. For example, the data delivery manager may initiate the data stream 210a, which includes a data buffer of data to be sent out to the destination. In embodiments, the data buffer may serve as a durable data buffer that can be used to pause and re-start transmission of the data of the data transfer job (e.g., after recovery from a failure or other event that interrupts the data stream). Similarly, the streaming service may include any number of incoming data streams 212 for incoming data to local services.

In some embodiments, the data delivery service implement a data delivery technique that uses physical transport of the data on a shippable storage device. In some cases, the data may by streamed, as described herein (e.g., initiated by the data delivery service and streamed), from a service at the infrastructure to the shippable storage device at the infrastructure (e.g., the device is connected to a local network of the infrastructure or receives data from the delivery service remotely). The shippable storage device may then be physically shipped to another infrastructure. The data delivery service (e.g., another instance of the delivery service) at the other infrastructure then initiates another data stream to transfer the data from the shippable storage device to a service at the other infrastructure.

Figure 3:
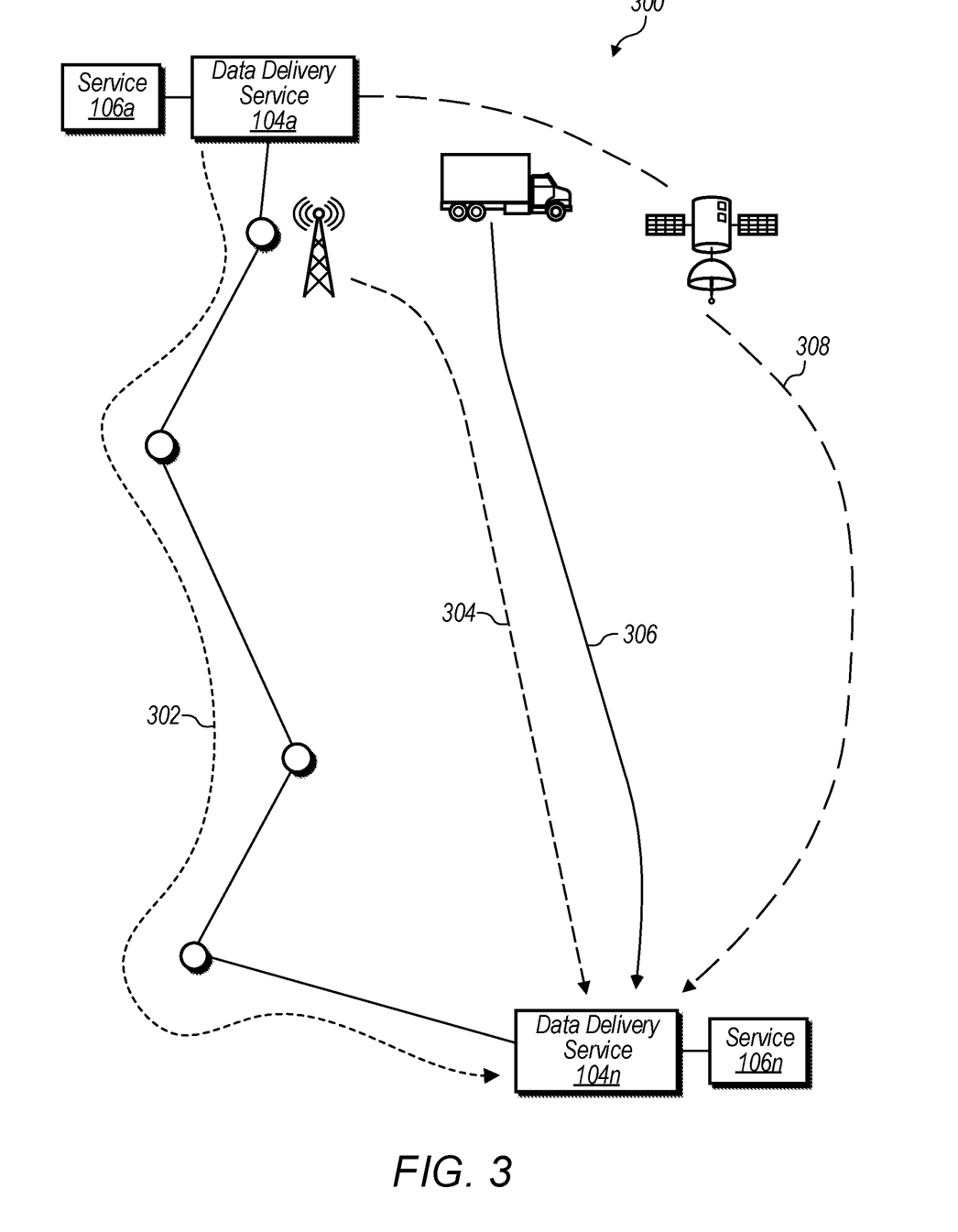
FIG. 3 is a block diagram of various data delivery techniques that may be used to implement flexible scheduling of data transfers between computing infrastructure collections for efficient resource utilization, according to some embodiments.

FIG. 3 is a block diagram of various data delivery techniques that may be used to implement flexible scheduling of data transfers between computing infrastructure collections for efficient resource utilization, according to some embodiments.

As shown, a data delivery service may perform data transfers via internet 302 (e.g., fiber), cellular 304, physical transport 306, or satellite 308. In embodiments, each data delivery technique uses one or more data transfer resources to transfer data from a source infrastructure to a destination infrastructure. For example, a cellular technique may use any number of cell towers, base stations, routers, fiber lines, etc. In embodiments, any other data transfer technique and corresponding data transfer resources may be used to transfer data between infrastructures, including other techniques described herein.

In some embodiments, there may be no available data delivery technique to transfer data from the data delivery service 104a to the service 104n. In such cases, a message may be sent to the service 106a and/or to a client to indicate that no data delivery techniques are currently available to transfer the data. In some cases, a land or air vehicle may be assigned to physically transport the data or to install or upgrade equipment at the infrastructure that uses the data delivery service 104a (and/or at the other infrastructure that uses the data delivery service 104n) in order to enable one or more data delivery techniques for sending data from the delivery service 104a to the other data delivery service 104n.

Figure 4:
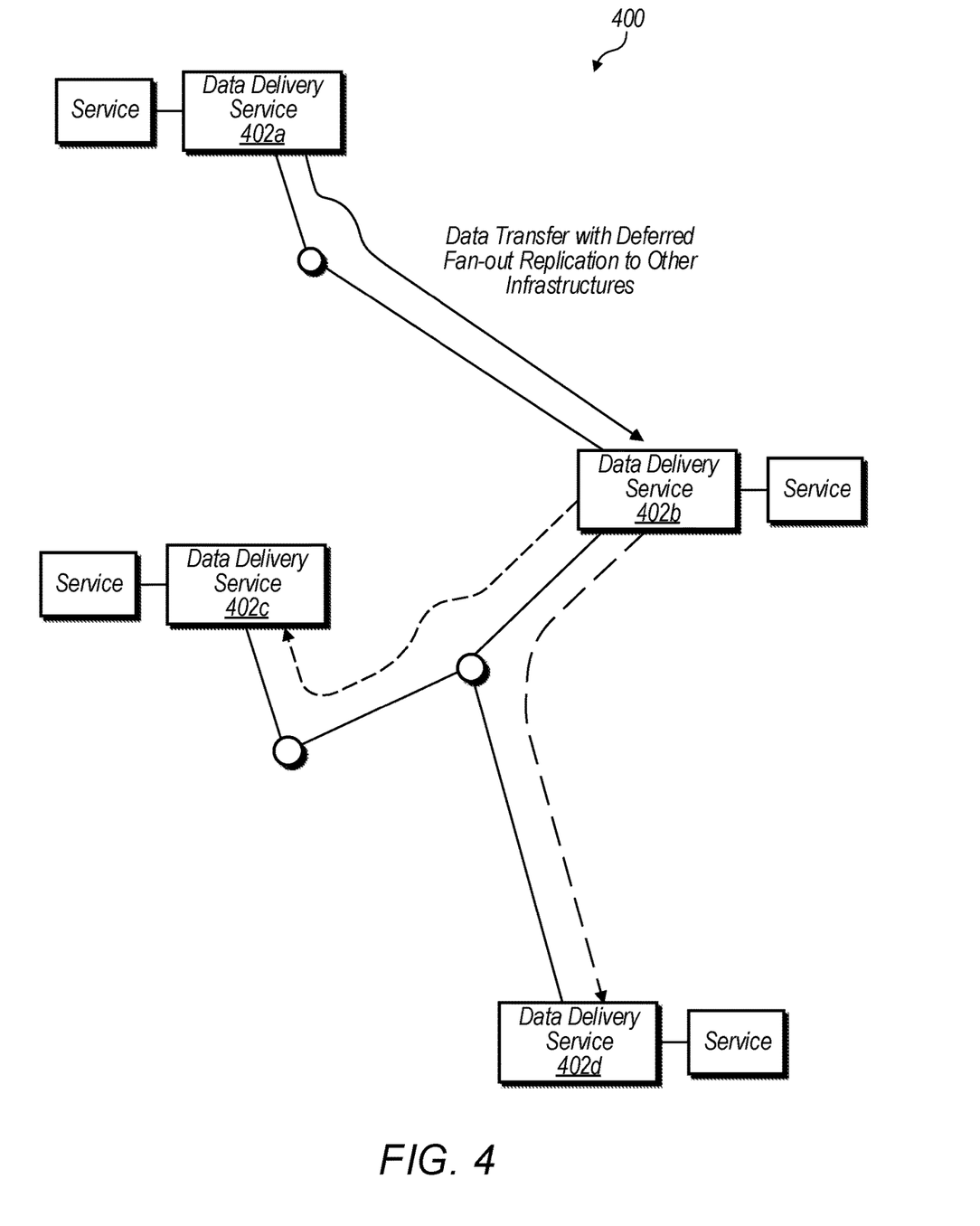
FIG. 4 is a block diagram of a data transfer with deferred replications in a destination region, according to some embodiments.

FIG. 4 is a block diagram of a data transfer with deferred replications in a destination infrastructure, according to some embodiments. In the illustrated embodiments, flexibility parameters for a data transfer job may include two deferred replications (e.g., to two other infrastructures) and associated deferred replication deadlines to occur subsequent to transfer of the data to the data delivery service 402b of a particular infrastructure. The delivery service 402a may determine a schedule for performing data transfer jobs based at least on the analysis of the deferred replications and associated deferred replication deadlines for the data transfer job.

The service 402a may then initiate the transfer of the data for the data transfer jobs in accordance with the deferred replications and associated deferred replication deadlines for the data transfer job. In embodiments, multiple different jobs may include deferred replication. This may reduce the amount of congestion that would otherwise occur on data transfer resources (e.g., on the backbone network) to perform two additional replications of the data. For example, the physical distance between delivery service 402a and delivery service 402b may be much longer than the physical distance between delivery service 402b and the delivery services 402c and 402d. This may occur, for example, if delivery service 402a is on a different continent than the other delivery services.

Figure 5:
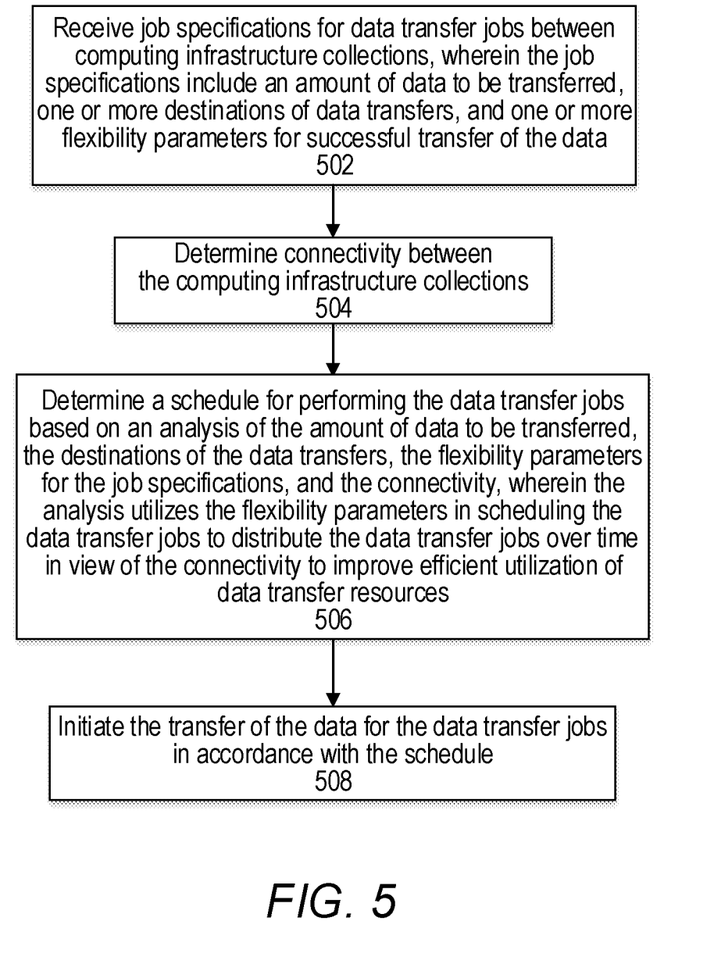
FIG. 5 is a flow diagram that illustrates implementing flexible scheduling of data transfers between computing infrastructure collections for efficient resource utilization, according to some embodiments.

FIG. 5 is a flow diagram that illustrates implementing flexible scheduling of data transfers between computing infrastructure collections for efficient resource utilization, according to some embodiments. At block 502, the data delivery service receives job specifications for data transfer jobs between infrastructures, wherein the job specifications include an amount of data to be transferred, one or more destinations of data transfers, and one or more flexibility parameters for successful transfer of the data. At block 504, the data delivery service determines connectivity between computing infrastructure collections.

At block 506, the data delivery service determines a schedule for performing the data transfer jobs based on an analysis of the amount of data to be transferred, the destinations of the data transfers, the flexibility parameters for the job specifications, and the connectivity, wherein the analysis utilizes the flexibility parameters in scheduling the data transfer jobs to distribute the data transfer jobs over time in view of the connectivity to improve efficient utilization of data transfer resources. At block 508, the data delivery service initiates the transfer of the data for the data transfer jobs in accordance with the schedule.

Figure 6:
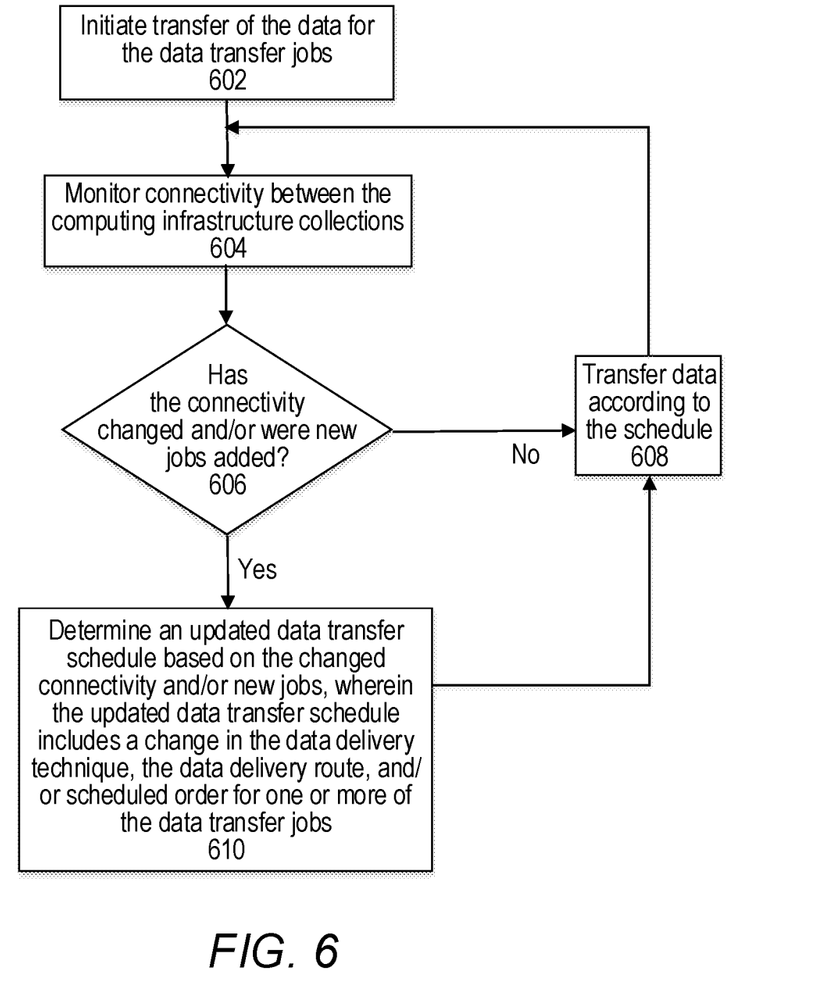
FIG. 6 is a flow diagram that illustrates updating a data transfer schedule to implement flexible scheduling of data transfers between computing infrastructure collections for efficient resource utilization, according to some embodiments.

FIG. 6 is a flow diagram that illustrates updating a data transfer schedule to implement flexible scheduling of data transfers between computing infrastructure collections for efficient resource utilization, according to some embodiments. At block 602, the data delivery service initiates transfer of the data for the data transfer jobs. At block 604, the data delivery service monitors connectivity between computing infrastructures.

At block 606, the data delivery service determines whether connectivity changes and/or new data transfer jobs were added. In embodiments, the data delivery service may also determine whether the status of current data transfer jobs has changed (e.g., reduction in data transfer rate or a halt in data transmission before the entire amount of data is delivered). If not, then the process returns to 608, where the data transfer is performed according to the schedule.

If the data delivery service determines that connectivity changes and/or new data transfer jobs were added (and/or status of one or more jobs has changed), then at block 610, the data delivery service determines an updated data transfer schedule based on the changed connectivity and/or new jobs and/or changes in job status, wherein the updated data transfer schedule includes a change in the data delivery technique, the data delivery route, and/or scheduled order for one or more of the data transfer jobs. For example, a data delivery route for a backbone network may be changed by re-routing to use a different fiber network that goes through a different city or hub. Another example may be changing cellular routing to use one or more different cell towers or changing satellite routing to use one or more different satellites. The above cases may occur if the connectivity indicates that one or more fiber links are down/failed, one or more cell towers are down/failed or one or more satellites are down/failed. Thus, failed data transfer resources may result in re-routing data or even using an alternative data delivery technique (e.g., changing from using satellite to using cellular). In some embodiments, a change in the job status (e.g., due to reduction or halt in data transmission) may result in cancellation of the job or moving the job to the end or towards the end of the schedule (e.g., to occur last or closer to last in time). The process then returns to block 408.

Any of various computer systems may be configured to implement processes associated with the data delivery service, other services of the provider network, computing infrastructure collections, clients, data transfer resources, or any other component of the above figures. For example, FIG. 7 is a block diagram illustrating an example computer system that implements some or all of the techniques described herein, according to some embodiments.

Figure 7:
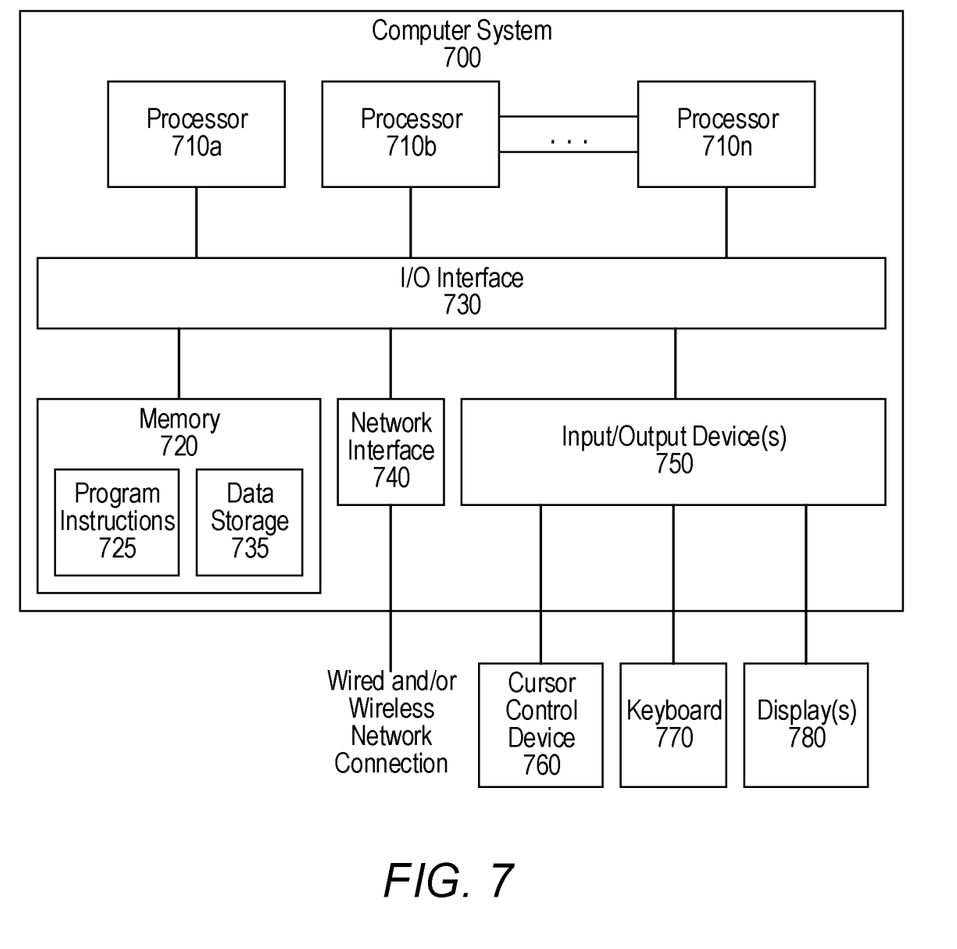
FIG. 7 is a block diagram illustrating an example computer system that implements some or all of the techniques described herein, according to some embodiments.

In various embodiments, the data delivery service, other services of the provider network, computing infrastructure collections, clients, data transfer resources, or any other component of any of FIGS. 1-4 may each include one or more computer systems 700 such as that illustrated in FIG. 7. In embodiments, the data delivery service, other services of the provider network, computing infrastructure collections, clients, data transfer resources, or any other component may include one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the file gateway, object storage system, client devices, or service provider are shown stored within system memory 720 as program instructions 725. In some embodiments, system memory 720 may include data 735 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other computer systems 700 or devices attached to a network, such as the local network discussed above, a wide-area network, or a local network within the provider network, for example. In particular, network interface 740 may be configured to allow communication between computer system 700 and/or various I/O devices 750. I/O devices 750 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices 750 may be relatively simple or "thin" client devices. For example, I/O devices 750 may be configured as dumb terminals with display, data entry and communications capabilities, but otherwise little computational functionality. However, in some embodiments, I/O devices 750 may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices 750 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 750 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device 750 (e.g., cursor control device 760, keyboard 770, or display(s) 770 may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data delivery service, other services, computing infrastructure collections, data transfer resources and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices of a provider network comprising respective processors and memory to implement a data delivery service to:
receive respective job specifications for a plurality of data transfer jobs between computing infrastructure collections, wherein a respective job specification of the plurality of job specifications specifies:
an amount of data to be transferred for the data transfer job;
one or more destinations of data transfers for the data transfer job; and
one or more flexibility parameters for successful transfer of the data for the data transfer job;
determine connectivity between the computing infrastructure collections
determine a schedule for performing the plurality of data transfer jobs between the computing infrastructure collections based at least on an analysis of the amount of data to be transferred, the destinations of the data transfers, the flexibility parameters for the respective job specifications, and the connectivity, wherein the analysis utilizes the flexibility parameters for the respective job specifications in scheduling the data transfer jobs to initiate different ones of the data transfer jobs at different times in view of the connectivity to improve efficient utilization of data transfer resources; and
initiate the transfer of the data for the plurality of data transfer jobs between the computing infrastructure collections in accordance with the schedule.

2. The system as recited in claim 1, wherein the one or more flexibility parameters for one or more of the data transfer jobs comprises a deadline to transfer the data to the one or more destinations of the one or more respective data transfer jobs, and wherein the one or more computing devices are configured to implement the data delivery service to:
determine the schedule for performing the plurality of data transfer jobs between computing infrastructure collections based at least on the analysis of the deadline to transfer the data to the one or more destinations of the one or more respective data transfer jobs; and
initiate the transfer of the data for the plurality of data transfer jobs in accordance with the deadline to transfer the data for the one or more respective data transfer jobs.

3. The system as recited in claim 1, wherein the one or more flexibility parameters for one or more of the data transfer jobs comprises a plurality of acceptable data delivery techniques to transfer the data to the one or more destinations of the one or more respective data transfer jobs, wherein the plurality of acceptable data delivery techniques comprises two or more of fiber, dedicated fiber, satellite, cellular, digital subscriber line, microwave, radio, a pre-established connection to the one or more destinations, or physical transport via data storage device, and wherein the one or more computing devices are configured to implement the data delivery service to:
determine the schedule for performing the plurality of data transfer jobs between computing infrastructure collections based at least on the analysis of the plurality of acceptable data delivery techniques to transfer the data to the one or more destinations of the one or more respective data transfer jobs; and
initiate the transfer of the data for the plurality of data transfer jobs in accordance with the acceptable data delivery techniques to transfer the data for the one or more respective data transfer jobs.

4. The system as recited in claim 1, wherein to initiate the transfer of the data for the plurality of data transfer jobs between computing infrastructure collections accordance with the schedule, the one or more computing devices are configured to implement the data delivery service to:
initiate a data stream for at least one of the scheduled data transfer jobs to begin streaming the data from a local service to a destination of the scheduled data transfer job using a data delivery route.

5. The system as recited in claim 4, wherein the one or more computing devices are configured to implement the data delivery service to:
determine an updated connectivity between the computing infrastructure collections;
determine an updated schedule for performing the plurality of data transfer jobs between computing infrastructure collections based at least on another analysis of a remaining amount of the data to be transferred, destinations of the data transfers, the flexibility parameters for the respective job specifications, and the updated connectivity, wherein the other analysis utilizes the flexibility parameters in scheduling the data transfer jobs to distribute the data transfer jobs over time in view of the updated connectivity to improve efficient utilization of the data transfer; and
cause a remaining amount of the data for the at least one scheduled data transfer job to begin streaming to the destination of the scheduled data transfer job using a different data delivery route in accordance with the updated schedule.

6. A method, comprising:
performing, by one or more computing devices of a provider network:
receiving respective job specifications for a plurality of data transfer jobs between computing infrastructure collections, wherein a respective job specification of the plurality of job specifications specifies:
an amount of data to be transferred for the data transfer job;
one or more destinations of data transfers for the data transfer job; and
one or more flexibility parameters for successful transfer of the data for the data transfer job;
determining connectivity between the computing infrastructure collections;
determining a schedule for performing the plurality of data transfer jobs based at least on an analysis of the amount of data to be transferred, the destinations of the data transfers, the flexibility parameters for the respective job specifications, and the connectivity, wherein the analysis utilizes the flexibility parameters for the respective job specifications in scheduling the data transfer jobs to initiate different ones of the data transfer jobs at different times in view of the connectivity to improve efficient utilization of data transfer resources; and
initiating the transfer of the data for the plurality of data transfer jobs in accordance with the schedule.

7. The method as recited in claim 6, wherein the one or more flexibility parameters for one or more of the data transfer jobs comprises a deadline to transfer the data to the one or more destinations of the one or more respective data transfer jobs, and further comprising:
  determining the schedule for performing the plurality of data transfer jobs based at least on the analysis of the deadline to transfer the data to the one or more destinations of the one or more respective data transfer jobs; and
  initiating the transfer of the data for the plurality of data transfer jobs in accordance with the deadline to transfer the data for the one or more respective data transfer jobs.

8. The method as recited in claim 6, wherein initiating the transfer of the data for the plurality of data transfer jobs in accordance with the schedule comprises:
  initiating a data stream for at least one of the scheduled data transfer jobs to begin streaming the data from a local service to a destination of the scheduled data transfer job.

9. The method as recited in claim 8, wherein the data is streamed from the local service to the destination using a data delivery technique, and further comprising:
  determining an updated connectivity between the computing infrastructure collections;
  determining an updated schedule for performing the plurality of data transfer jobs based at least on another analysis of a remaining amount of the data to be transferred, destinations of the data transfers, the flexibility parameters for the respective job specifications, and the updated connectivity, wherein the other analysis utilizes the flexibility parameters in scheduling the data transfer jobs to distribute the data transfer jobs over time in view of the updated connectivity to improve efficient utilization of the data transfer resources; and
  causing a remaining amount of the data for the at least one scheduled data transfer job to begin streaming to the destination of the scheduled data transfer job using a different data delivery technique or changing the delivery technique for one or more of the scheduled data transfer jobs in accordance with the updated schedule.

10. The method as recited in claim 8, further comprising:
  determining an updated connectivity between the computing infrastructure collections;
  determining an updated schedule for performing the plurality of data transfer jobs based at least on another analysis of a remaining amount of the data to be transferred, destinations of the data transfers, the flexibility parameters for the respective job specifications, and the updated connectivity, wherein the other analysis utilizes the flexibility parameters in scheduling the data transfer jobs to distribute the data transfer jobs over time in view of the updated connectivity to improve efficient utilization of the data transfer resources;
  pausing the streaming of a remaining amount of the data from the local service to the destination of the scheduled data transfer job in accordance with the updated schedule; and
  in response to passage of a threshold period of time since the pausing of the streaming, resuming the streaming of the remaining amount of the data from the local service to the destination of the scheduled data transfer job.

11. The method as recited in claim 8, wherein the destination is a different type of service than the local service, and wherein the local service stores data according to a different data storage technique than the remote service.

12. The method as recited in claim 6, wherein initiating the transfer of the data for the plurality of data transfer jobs in accordance with the schedule comprises:
  initiating a data stream for at least one of the scheduled data transfer jobs to begin streaming the data of the at least one data transfer job from a service of one of the computing infrastructure collections to a storage device;
  after the data for the at least one data transfer job is transferred to the storage device, physically transporting the storage device to another of the computing infrastructure collections; and
  initiating another data stream for the at least one data transfer job to begin streaming the data of the at least one data transfer job from the storage device to another service of the other computing infrastructure collection.

13. The method as recited in claim 6, wherein the one or more flexibility parameters for one or more of the data transfer jobs comprises a maximum cost to transfer the data, and further comprising:
  determining the schedule for performing at least one of the data transfer jobs based at least on the analysis of the maximum cost to transfer the data and minimum transmission bandwidth to transfer the data, wherein the analysis comprises selecting a data delivery route that provides the highest transmission bandwidth to transfer the data that allows the data to be transferred at or below the maximum cost for cost optimization; and
  initiating the transfer of the data for the at least one of the data transfer jobs in accordance with the maximum cost to transfer the data and minimum transmission bandwidth to transfer the data.

14. One or more non-transitory computer-accessible storage media storing program instructions that when executed on or across one or more processors:
  receive respective job specifications for a plurality of data transfer jobs between computing infrastructure collections, wherein a respective job specification of the plurality of job specifications specifies:
    an amount of data to be transferred for the data transfer job;
    one or more destinations of data transfers for the data transfer job; and
    one or more flexibility parameters for successful transfer of the data for the data transfer job;
  determine connectivity between the computing infrastructure collections;
  determine a schedule for performing the plurality of data transfer jobs based at least on an analysis of the amount of data to be transferred, the destinations of the data transfers, the flexibility parameters for the respective job specifications, and the connectivity, wherein the analysis utilizes the flexibility parameters for the respective job specifications in scheduling the data transfer jobs to initiate different ones of the data transfer jobs at different times in view of the connectivity to improve efficient utilization of data transfer resources; and
  initiate the transfer of the data for the plurality of data transfer jobs in accordance with the schedule.

15. The one or more storage media as recited in claim 14, wherein the one or more flexibility parameters for one or more of the data transfer jobs comprises a deadline to transfer the data to the one or more destinations of the one or more respective data transfer jobs, and further comprising program instructions that when executed on or across the one or more processors further cause the one or more processors to:

determine the schedule for performing the plurality of data transfer jobs based at least on the analysis of the deadline to transfer the data to the one or more destinations of the one or more respective data transfer jobs; and     initiate the transfer of the data for the plurality of data transfer jobs in accordance with the deadline to transfer the data for the one or more respective data transfer jobs.

16. The one or more storage media as recited in claim 14, wherein the one or more flexibility parameters for one or more of the data transfer jobs comprises a plurality of acceptable data delivery techniques to transfer the data to the one or more destinations of the one or more respective data transfer jobs, and further comprising program instructions that when executed on or across the one or more processors further cause the one or more processors to:

determine the schedule for performing the plurality of data transfer jobs based at least on the analysis of the plurality of acceptable data delivery techniques to transfer the data to the one or more destinations of the one or more respective data transfer jobs; and     initiate the transfer of the data for the plurality of data transfer jobs in accordance with the acceptable data delivery techniques to transfer the data for the one or more respective data transfer jobs.

17. The one or more storage media as recited in claim 14, wherein the one or more flexibility parameters for one or more of the data transfer jobs comprises one or more deferred replications and associated deferred replication deadlines to occur subsequent to transfer of the data to the one or more destinations of the one or more respective data transfer jobs, and further comprising program instructions that when executed on or across the one or more processors further cause the one or more processors to:

determine the schedule for performing the plurality of data transfer jobs based at least on the analysis of the one or more deferred replications and associated deferred replication deadlines for the one or more respective data transfer jobs; and     initiate the transfer of the data for the plurality of data transfer jobs in accordance with the one or more deferred replications and associated deferred replication deadlines for the one or more respective data transfer jobs.

18. The one or more storage media as recited in claim 14, wherein the connectivity comprises one or more of:

an amount of congestion for one or more transmission paths between the computing infrastructure collections; and     an expected amount of congestion for one or more of the transmission paths between the computing infrastructure collections due to scheduled data transfer jobs that have not yet started.

19. The one or more storage media as recited in claim 14, further comprising program instructions that when executed on or across the one or more processors further cause the one or more processors to:

receive one or more additional respective job specifications for additional data transfer jobs, wherein a respective job specification of the additional job specifications comprises:

an amount of data to be transferred for the additional data transfer job;

one or more destinations of data transfers for the additional data transfer job; and         one or more flexibility parameters for successful transfer of the data for the additional data transfer job;

determine an updated schedule for performing the plurality of data transfer jobs and the additional data transfer jobs based at least on another analysis of the amount of data to be transferred for the additional data transfer jobs and a remaining amount of data to be transferred for the plurality of data transfer jobs, the destinations of the data transfers for the additional data transfer jobs and the plurality of data transfer jobs, the flexibility parameters for the respective job specifications for the additional data transfer jobs and the plurality of data transfer jobs, and the connectivity, wherein the analysis utilizes the flexibility parameters in scheduling the data transfer jobs and the additional data transfer jobs to distribute the data transfer jobs and the additional data transfer jobs over time in view of the connectivity to improve efficient utilization of the data transfer resources, wherein an order of the schedule for performing the plurality of data transfer jobs is changed; and     initiate the transfer of the data for a remainder of the plurality of data transfer jobs and the additional data transfer jobs in accordance with the updated schedule.

20. The one or more storage media as recited in claim 14, further comprising program instructions that when executed on or across the one or more processors further cause the one or more processors to:

determine an updated connectivity between the computing infrastructure collections;

determine an updated schedule for performing the plurality of data transfer jobs based at least on another analysis of a remaining amount of the data to be transferred, destinations of the data transfers, the flexibility parameters for the respective job specifications, and the updated connectivity, wherein the other analysis utilizes the flexibility parameters in scheduling the data transfer jobs to distribute the data transfer jobs over time in view of the updated connectivity to improve efficient utilization of the data transfer resources; and     initiate the transfer of the data for a remainder of the plurality of data transfer jobs in accordance with the updated schedule.

\* \* \* \* \*